United States Patent Office 3,323,839
Patented June 6, 1967

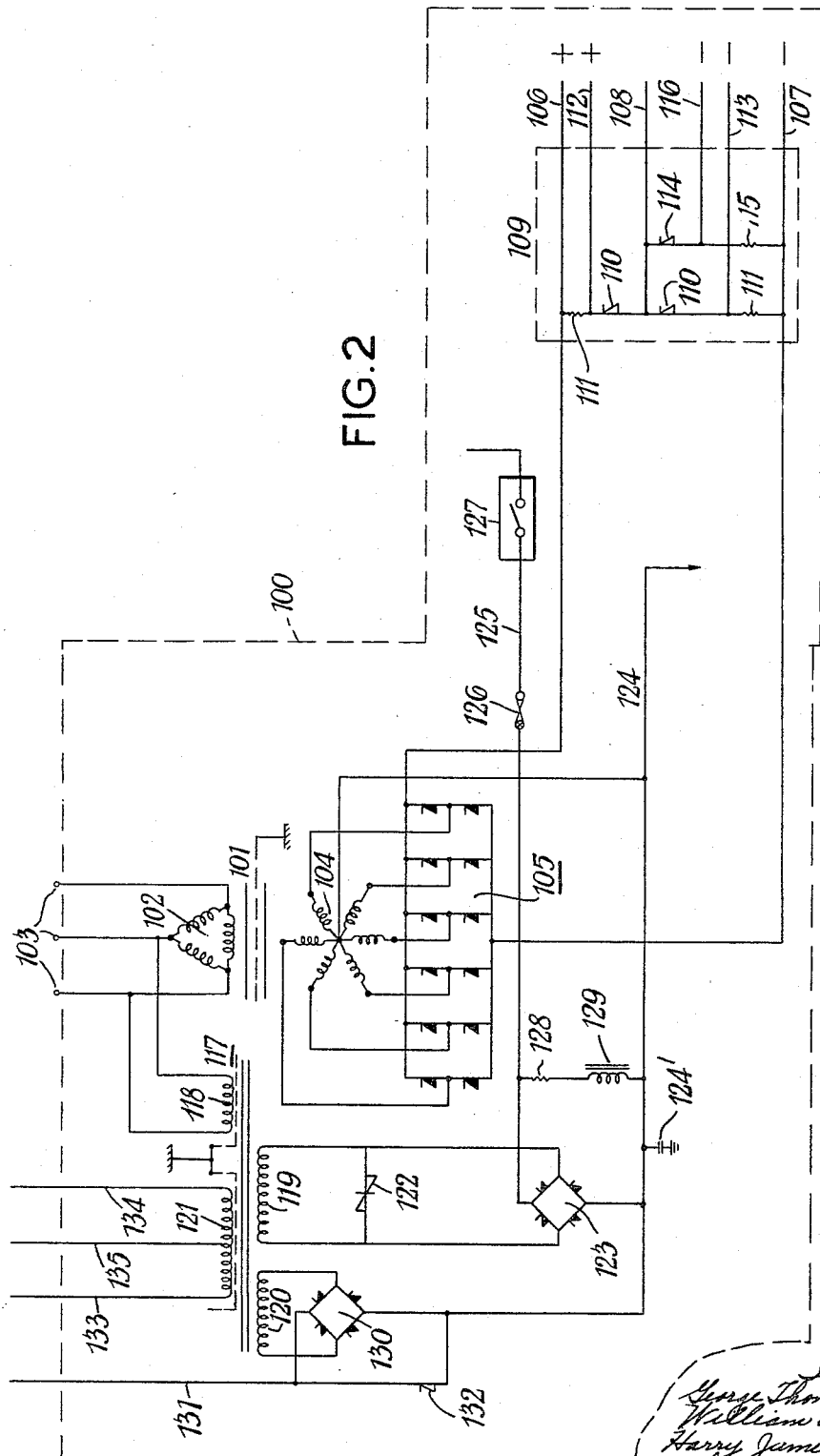

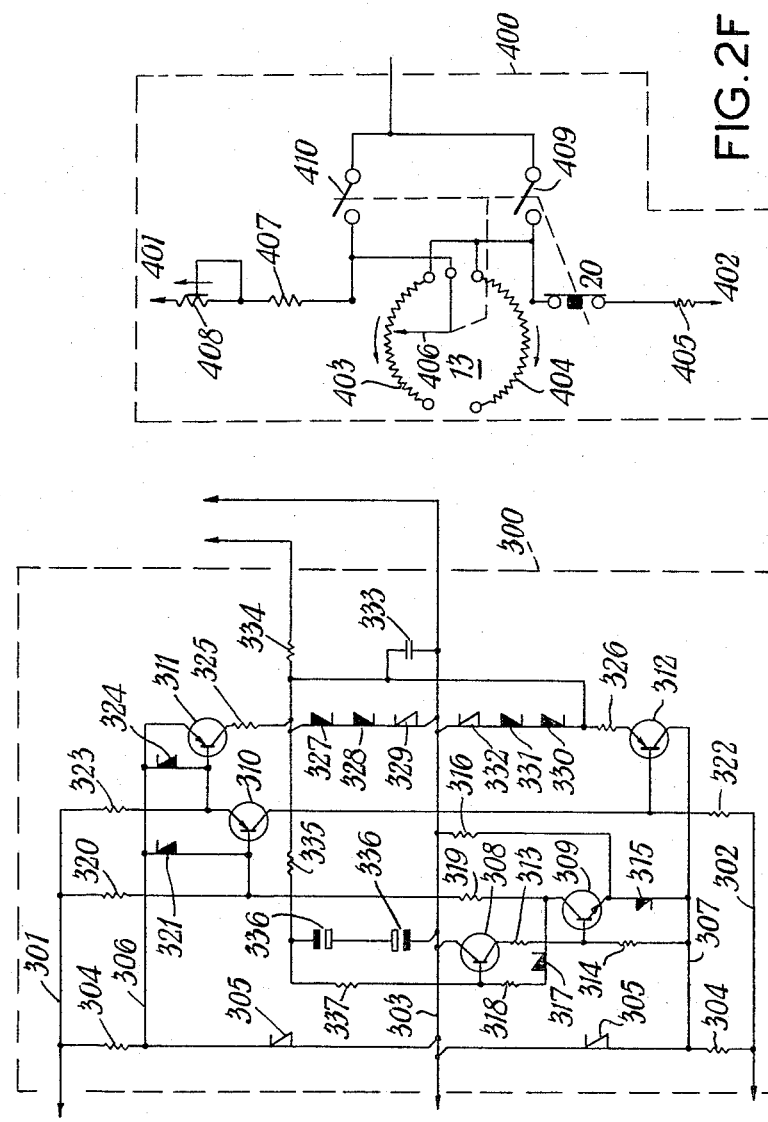

3,323,839
CUTTING APPARATUS HAVING SPEED AND LOAD CONTROLLED HYDRAULIC DRIVE
George Thomas Addison, Rugeley, William Askew, Horbury, near Wakefield, and Harry James Fruin, Staincross, Barnsley, England, assignors to British Jeffrey-Diamond Limited, Wakefield, England, a British company
Filed Jan. 14, 1965, Ser. No. 425,436
Claims priority, application Great Britain, Jan. 15, 1964, 1,877/64
7 Claims. (Cl. 299—1)

ABSTRACT OF THE DISCLOSURE

A material cutting machine having a cutting element and a hydraulically operated traversing motor. The traversing motor is provided with a speed control and a load control, the former arising from the comparison of a variable strength speed reference signal and a signal which is dependent in strength upon the position of a speed regulating element for the traversing motor and resulting in the traversing motor being speeded up or slowed down depending upon which of the two signals is the greater. The load control is governed by a third signal which is dependent in strength upon the load on the cutting element and is operative in the event of the load exceeding a predetermined value to override the speed control and slow down the traversing motor. In the event of the cutting element being overloaded by a predetermined amount, the load control operates to rapidly slow down the traversing motor.

This invention relates to material cutting machines, for example coal cutting machines, and is concerned with the provision of an improved control system in such machines.

The present invention provides a material cutting machine having a cutting element, propulsion means for traversing said cutting element during a cutting operation, means for producing an electrical signal dependent in strength upon the speed of cutting element travel, means for producing a variable strength speed reference signal, means for producing a load signal in the event of the load on the cutting element exceeding a predetermined value, and propulsion control means responsive to said signals and operative in the absence of a load signal, to increase or decrease said speed of advance in the event of the strength of said speed reference signal being respectively greater or less than that of said speed dependent signal and, if a load signal is produced, to restrict said speed of travel so as to limit the load on said cutting element.

Figure 1:
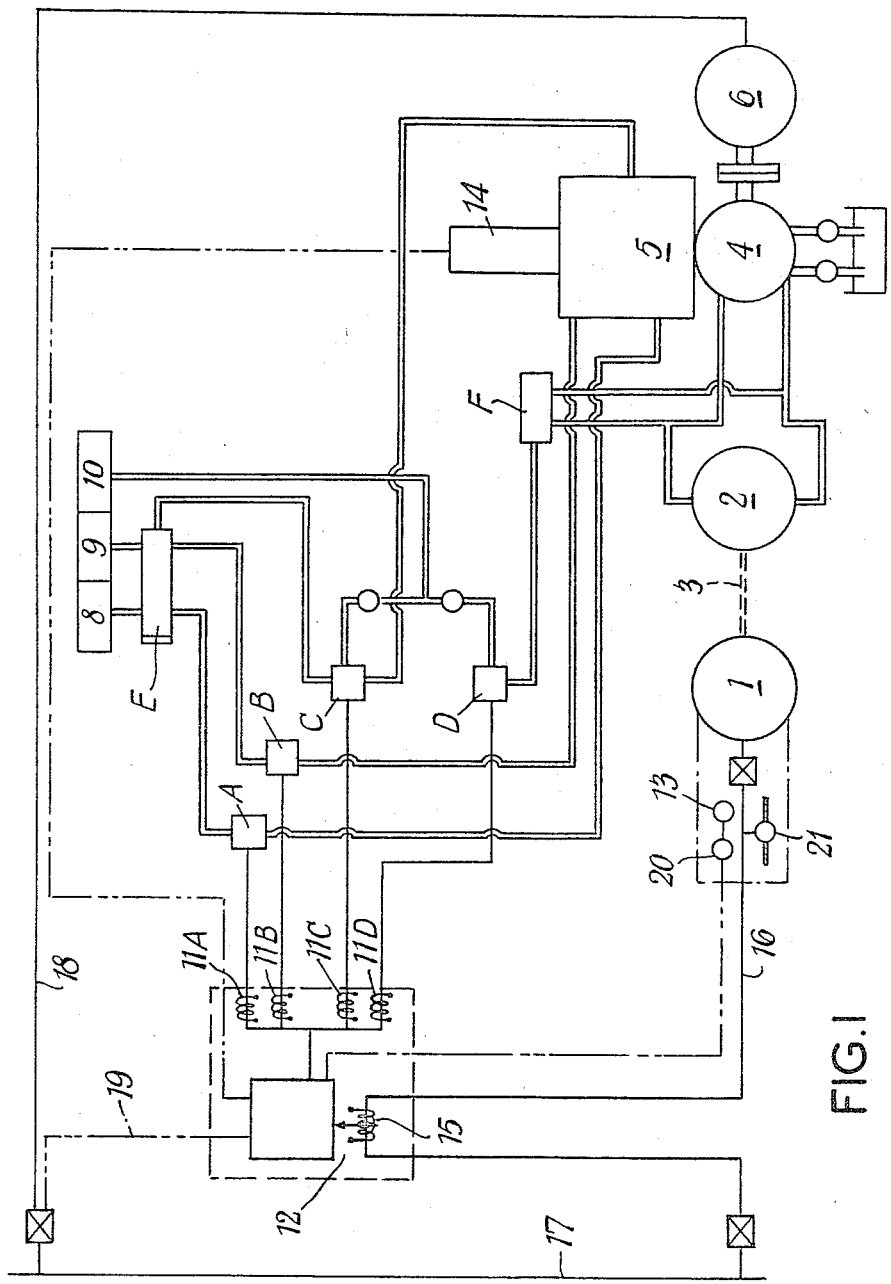

In order that the invention may be more fully understood, one form of coal cutting machine, in accordance with the invention, will now be described, by way of example, with reference to the accompanying drawings in which, FIGURE 1 shows a schematic layout of the machine and associated control system and, FIGURES 2 to 2F show a circuit diagram of an electrical control apparatus incorporated in the machine.

Referring to FIGURE 1, the machine includes a cutting element (not shown) which is powered by an electric driving motor 1 and which is arranged to travel across the coal face being cut under the action of propulsion means in the form of a variable-speed hydraulic capstan motor 2 which is operatively connected to the cutting machine by means of an endless hauser indicated diagrammatically at 3 such that the capstan motor can pull the machine in either direction across the coal face.

The hydraulic motor 2 is controlled by a variable delivery pump 4 of the kind having a thrustor block the position of which determines the pump output. The thrustor block is itself mounted in a hydraulic cylinder 5 and is arranged so that movement of the thrustor block away from a central position, in which the output of the pump is zero, in one direction, causes the pump to supply oil to the capstan motor to advance the machine, the pump delivery, and hence the speed of advance being dependent upon the extent of thrustor block movement from the central position. Movement of the thrustor block in the other direction similarly causes the capstan to withdraw the cutting machine. The pump is driven by an electric motor 6 through a coupling 7.

For the purpose of controlling the thrustor block position, and hence speed of cutting element travel, the cylinder 5 is connected in a hydraulic supply circuit incorporating three auxiliary pumps 8, 9 and 10 the first of which is connected, through a valve A, to an inlet of the cylinder 5 which is positioned so that fluid introduced through this inlet causes the thrustor block to move in a direction to increase the speed of cutting element travel if the machine is being advanced. Valve A is operated by a solenoid 11A forming part of control apparatus 12, which will be described later, and the arrangement is such that energisation of the solenoid coil causes the valve to open to allow fluid to flow from the first auxiliary pump to the thrustor block cylinder. Closure of the valve in response to de-energisation of the solenoid 11A serves to exhaust the inlet of the cylinder 5. The second auxiliary pump 9 is connected, through a valve B, to a second inlet of the cylinder 5 which is positioned so that fluid introduced into this inlet causes the thrustor block to move in a direction to reduce the speed of cutting element travel if the machine is being advanced. Valve B is similarly operated by a solenoid 11B. It should be mentioned that during withdrawal of the cutting machine, the roles of the respective valves will be reversed so that opening of the valve B will increase the speed of cutting element travel whilst opening of the valve A will decrease this speed of travel. The third auxiliary pump 10 is connected through a valve C to a third inlet of the cylinder 5 through which oil can be fed to return the thrustor block rapidly to its central position in circumstances to be described later, valve C also being solenoid operated but being constructed so that the valve is open to provide a connection between the pump 10 and the respective inlet upon-de-energisation of the solenoid and vice-versa. The solenoid for valve C is referenced 11C. Upon opening, valve C additionally allows hydraulic fluid to be fed to an isolating valve E interposed in the connections between the auxiliary pumps 8 and 9 and their respective valves such as to close this isolating valve which then prevents fluid flowing from the pumps to the valves A and B and which by a connection, not shown, then opens the inlets respectively served by these valves to exhaust. A further solenoid operated valve D is incorporated in a pipe which, as shown, is branched from the pipe connecting the auxiliary pump 10 with valve C and which leads to a stop valve F incorporated in a by-pass for the capstan motor. The arrangement is such that de-energisation of the solenoid 11D causes D to open allowing fluid to be fed to the stop valve which is then opened to allow pressure fluid from the pump merely to be circulated through the by-pass and thus allow the capstan motor to halt.

The valves A to D are controlled by the electrical control apparatus 12 which provides control of the speed of cutting element advance subject to an overriding load control, that is to say, a control which limits the load to which the cutting element is subjected. Speed control is obtained by comparing a speed reference signal obtained from a potentiometer 13 with a speed dependent signal obtained from a linear voltage differential transformer 14 which is controlled by the thrustor block. Load control is obtained by means of a current transformer 15 in the supply cable 16 connecting the motor 1 to a main supply line 17. FIGURE 1 also shows a supply cable 18 to the pump motor 6 and a further supply cable 19 to the apparatus 12. The reference numeral 20 indicates a haulage stop button forming part of the potentiometer 13 and 21 indicates a chain operated complete emergency stop control both of which will be explained later.

Figure 2A:
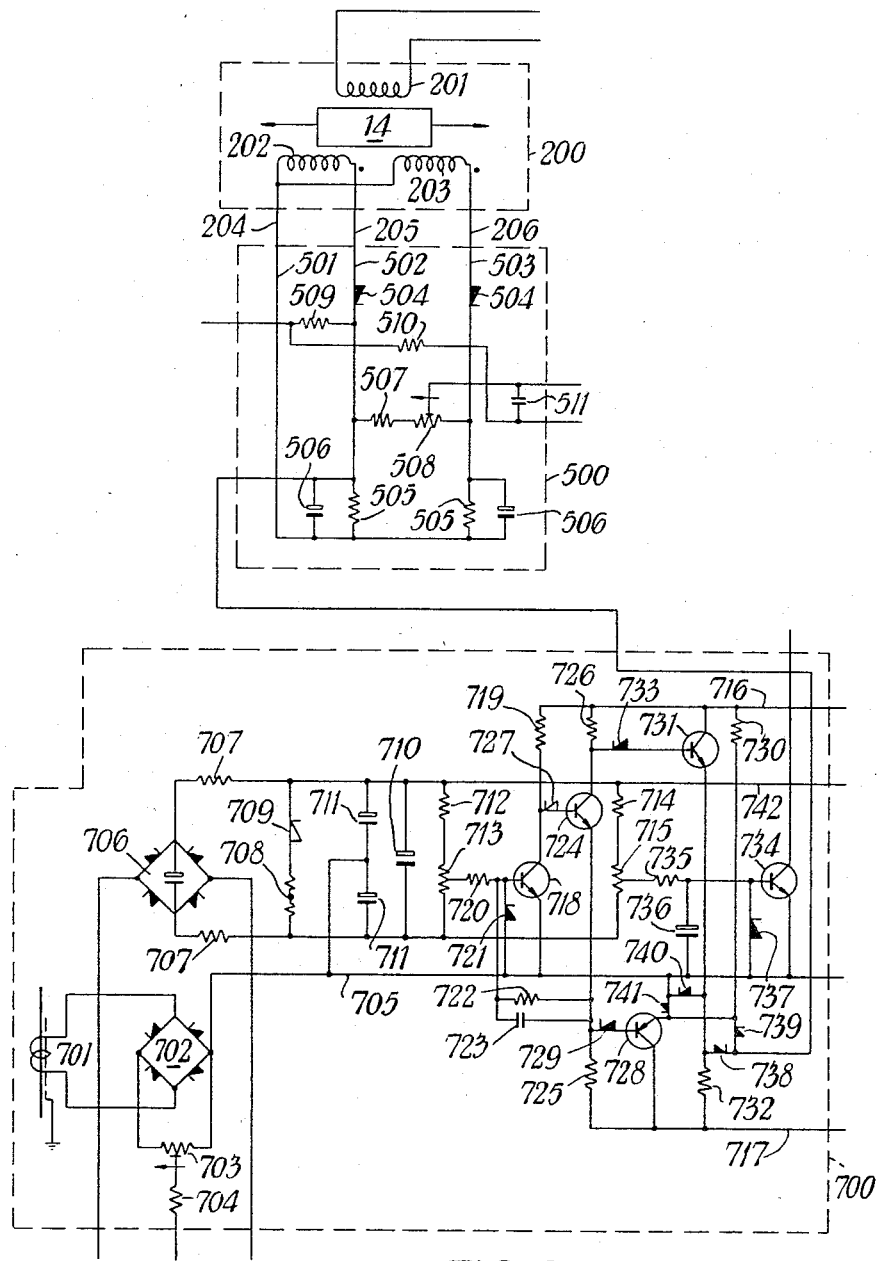
Figure 2B:
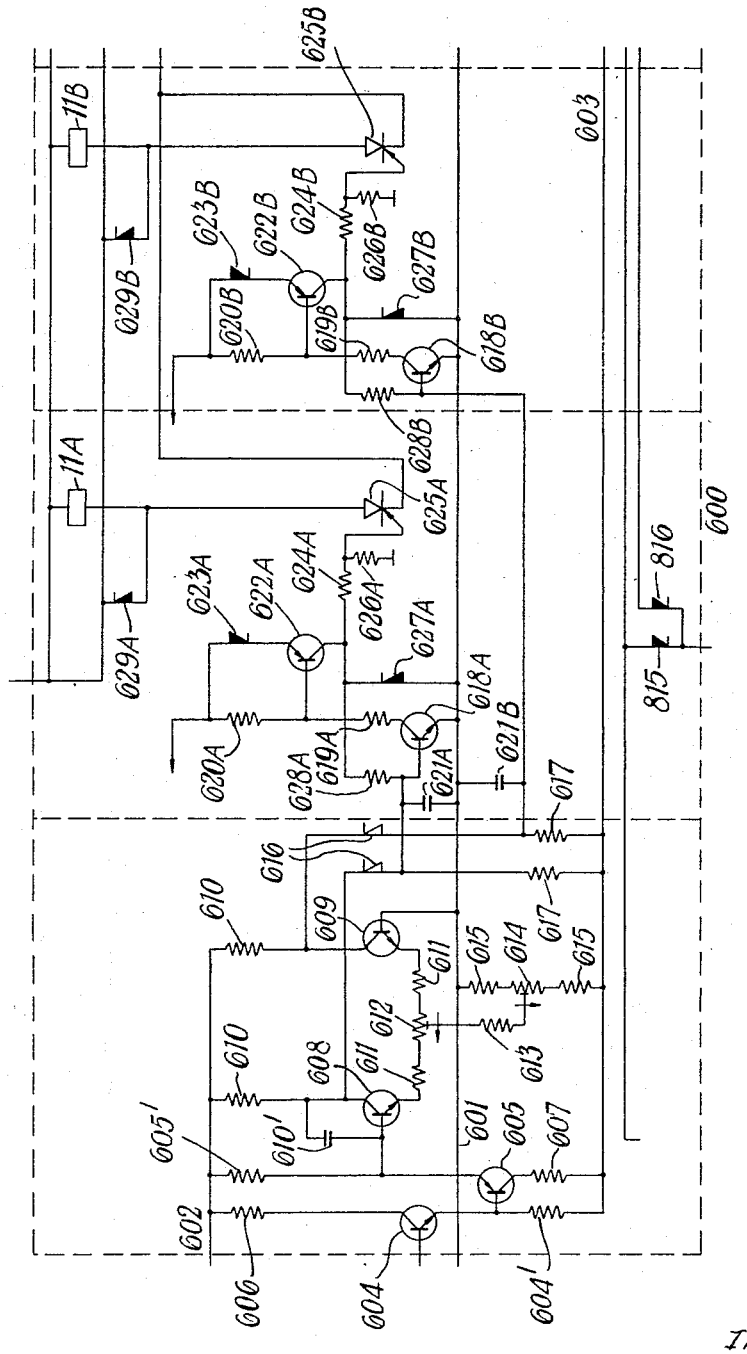
Figure 2C:
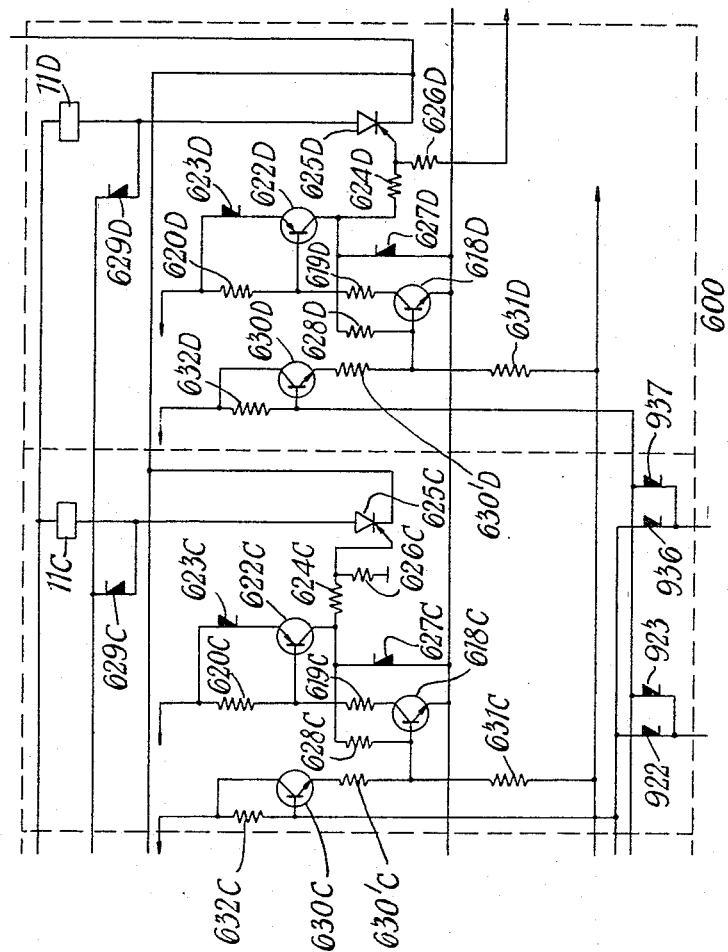
Figure 2D:
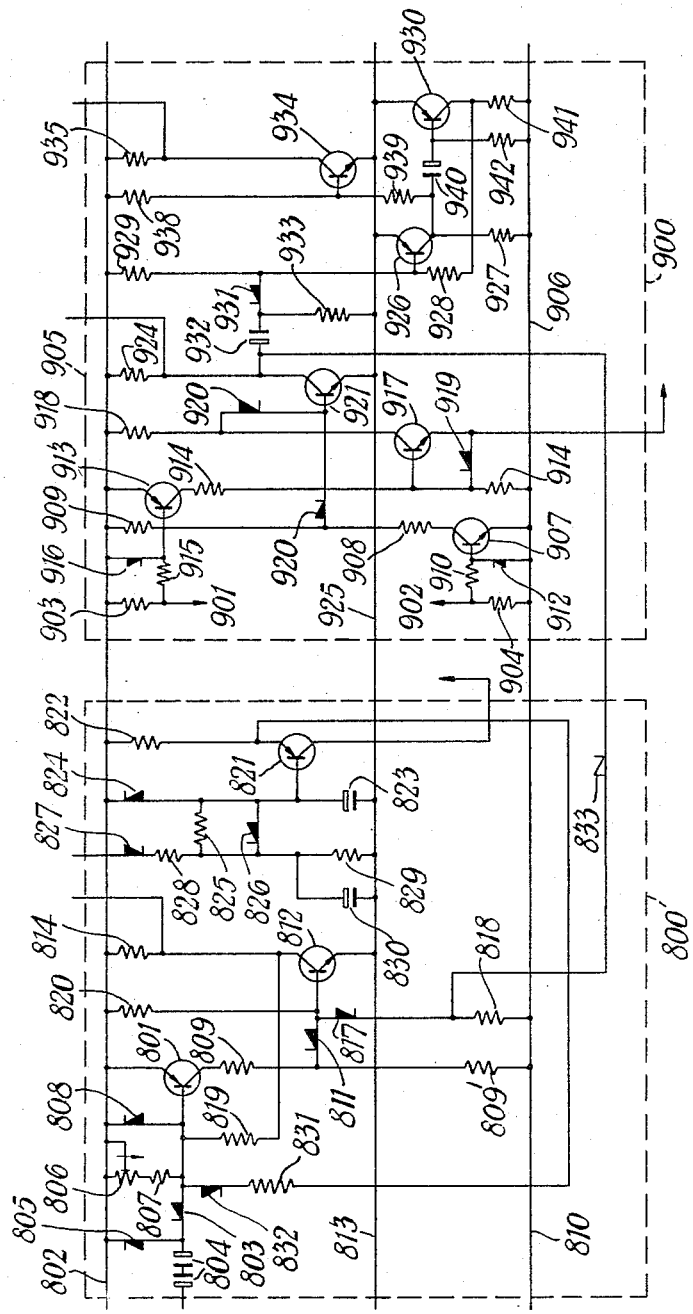

Referring now to FIGURES 2 to 2F, the control apparatus comprises nine main units, a power supply unit 100 (FIGURE 2), a thrustor position detector unit 200 (FIGURE 2A) incorporating the above mentioned linear voltage differential transformer which is controlled by the position of the thrustor block for producing a signal the strength of which is dependent upon the speed of the capstan motor, a supply unit 300 (FIGURE 2E) for the tranformer unit, a potentiometer control unit 400 (FIGURE 2F) for producing a variable strength speed reference signal, a phase sensitive rectifier unit 500 (FIGURE 2A) which compares the two signals, and a variable backlash amplifier and valve control unit 600 (FIGURES 2B and 2C) for controlling the valves A and B so as to increase or decrease the speed of cutting element travel in dependence upon the reference signal being greater or less respectively than the speed dependent signal. The circuit further comprises a load control unit 700 (FIGURE 2A) which incorporates means for producing a signal in the event of load on the cutting element achieving a predetermined value, to limit the speed of cutting element travel, an end of cut control unit 800 (FIGURE 2D) which incorporates a supply-on delay timer and a stop control unit 900 (FIGURE 2D) which incorporates a supply-off delay timer.

Dealing first with the power supply unit (FIGURE 2), this comprises a three-phase transformer 101 the primary winding 102 of which is connected to a three-phase main supply 103, the secondary winding 104 being connected to a full wave rectifier 105. The rectifier supplies current through two main supply lines 106 and 107 which are at potentials above and below a main common return line 108. The unit 100 includes a stabilizer 109 which incoroporates a Zener diode 110 connected, in series with a resistor 111, across each of the leads 106, 107 and the common lead, a tapping being taken from the common terminal of each diode and resistor to provide two further supply lines 112 and 113. A further Zener diode 114 and series resistor 115 is connected across the leads 107 and 108 to provide, in a similar manner, an auxiliary supply line 116.

The unit also comprises a second transformer 117 having a primary 118 connected to two phases of the main supply and which has three secondary windings 119, 120 and 121. The first secondary winding 119, which has a Klipsel diode 122 connected across it, supplies a full-wave rectifying bridge 123 one of the output terminals of which is connected to a further common lead 124 which is earthed through a capacitor 124′ and the other output terminal of which is connected to a supply lead 125. The lead 125 incorporates a fuse 126 and a no-volts relay contact 127. A series resistor and choke 128, 129 are connected across the leads 124 and 125. The second secondary winding 120 is connected to a further full wave rectifying bridge 130 the output terminals of which are respectively connected to the common lead 124 and a supply lead 131; a Zener diode 132 is connected across the leads 124 and 131. The third secondary winding 121 is connected to two leads 133, 134 which provide, in conjunction with a centre tapping 135 from this winding, a further supply.

The thrustor position detector unit 200 (FIGURE 2A) incorporates, as previously mentioned, the linear voltage differential transformer 14 which has a primary winding 201 and two secondary windings 202, 203. A first output lead 204 is taken from the common connection of the windings 202, 203 to the phase sensitive rectifier unit 500. Second and third output leads 205, 206 are respectively taken from the remaining ends of the secondary windings to the rectifier unit 500. The primary winding is fed from a square wave oscillator constituting the above-mentioned transformer supply unit 300.

The L.V.D.T. supply unit 300 (FIGURE 2E) is basically an oscillator and has two supply lines 301, 302 with a common return line 303. The supply line 301 is connected to the supply lead 106 (FIGURE 2) and the second is connected to the lead 107 (FIGURE 2). Between each of these supply lines, and the common line, are connected a resistor and series Zener diode 304, 305. Leads are taken from the junction of each resistor 304 and associated diode 305 to provide two further supply lines 306, 307. The unit includes five transistors 308–312. The transistor 308 (p-n-p) has its emitter connected to the line 303 and its collector through two resistors 313, 314 to the line 307. The transistor 309 (n-p-n) has its base connected to the junction of the latter two resistors and its emitter connected through a diode 315 to the line 307 and also through a resistor 316 to the common line. The collector of the transistor 309 is connected through a series diode and resistor 317, 318 to the base of the transistor 308, and also through two series connected resistors 319, 320 to the supply line 301. The transistor 310 (p-n-p) has its base connected to the junction of the resistors 319, 320, and through a diode 321 to the line 306, its collector through a resistor 322 to the supply line 302 and its emitter through a resistor 323 to the supply line 301. The transistor 311 (p-n-p) has its base connected to the emitter of the transistor 310, and also through a diode 324 to the line 306, its emitter also being connected to line 306. The collector of this transistor is connected via two series connected resistors 325, 326 to the emitter of the transistor 312 (p-n-p). The resistor 325 is also connected to the line 303 through two diodes 327, 328 and a Zener diode 329 in series. In parallel with this diode arrangement is connected a similar arrangement 330, 331, 332 but with the polarity of the diodes reversed. The junction between the resistors 325, 326 is connected via a capacitor 333 to the common line, and also through a resistor 334 to one terminal of the primary winding 201 (FIGURE 2A) the other primary winding terminal being connected to the common line 303. The same junction is also connected through a resistor 335 and two series connected capacitors 336 to the common line 303, the junction between the resistor 335 and the capacitors 336 being connected through another resistor 337 to the base of the transistor 308. The collector of the transistor 312 is connected to the supply line 307 and its base is connected to the collector of the transistor 310.

In opeartion of the unit 300, the transistors 308, 309 serve to switch on and off the transistor 310 which drives the output transistors 311, 312. To cause oscillation a part of the output is fed back via the CR circuit composed of the resistance 337 and two capacitors 336 in series; the output, which has a frequency of 2.5 kc./s., is applied to the primary winding 201 of the linear voltage differential transformer 14. The transformer 14 then serves to vary the output signals fed along the leads 205, 206 differentially so that with the thruster block in a central position the output signals are equal but in opposition, whereas movement of the thruster block in one direction causes the signal in one lead to fall and the signal in the other lead to rise and vice-versa.

The potentiometer control unit 400 (FIGURE 2F) has two input terminals 401, 402 respectively connected to two terminals 901, 902 forming part of the stop control unit 900 (FIGURE 2D) and connected through resistors 903, 904 to leads 905, 906 which are themselves respectively connected to the main supply lines 112, 113 (FIGURE 2). The potentiometer 13 of the unit has two resistance windings 403, 404 one for forward travel of the cutting element and the other for rearward cutting element travel. These are connected together at one end and, also at this end, to the stop switch 20 which is itself connected to the negative terminal through a resistor 405. A wiper arm 406 which can contact either of the resistance windings, is connected through a resistor 407 and variable resistor 408 to the terminal 401, a lead incorporating forward and reverse switches 409, 410 being connected across the wiper 406 and the terminal of the stop switch 20 nearer the resistance windings 403, 404. The common terminal of the forward and reverse switches 409, 410 is connected to the phase sensitive rectifier unit 500.

The function of the potentiometer unit 400 is to feed into the rectifier unit 500 a speed reference signal which has a polarity in dependence upon the desired direction of cutting element travel and which has a strength dependent upon the desired speed of travel. The switches 409, 410 are, as indicated in the drawing, interlocked with the wiper arm 406 so that the appropriate switch is closed when the wiper arm is moved into contact with one of the resistance windings, the other switch being held open. Furthermore an interlock between the switches 409, 410 and the stop switch 20 ensures that the switches 409, 410 are opened on depression of the button for the switch 20.

The rectifier unit 500 (FIGURE 2A) has three input lines 501, 502, 503 connected respectively to the output lines 204, 205 and 206 from the unit 200. A diode 504 is inserted in each of the latter two lines and the end of the diode remote from the unit 200 is connected, in each case, via a parallel capacitor and resistor, 505, 506 to the common lead 501. Furthermore, the remote diode ends are connected together through a resistor 507 and a potentiometer 508 in series. To the diode end of this resistor 507 is fed the input from the potentiometer unit 400, via a resistor 509 and to the same point is fed an input from the load control unit 700. The input from the unit 400 is also fed, via a resistor 510, to a common line connected to the common line 124. The slider of the potentiometer 508 is connected to the common line, via a capacitor 511 and also to the base of a first transistor 604 (FIGURE 2B) in the backlash amplifier and valve control unit 600.

The function of the rectifier unit is to compare the signal from the potentiometer unit 400 with the signal from the transformer unit 200. If a balance is achieved between the two signals, the output of the rectifier unit in terms of potential of the slider of the potentiometer 508 with respect to the common lead is zero. If, on the other hand, an unbalance exists, the rectifier provides an output voltage which is fed from the slider of the potentiometer 508 into the unit 600 and the polarity of which depends upon whether the speed reference signal is greater or less than the speed dependent signal.

The purpose of the resistor network in the phase sensitive rectifier unit is to bring the input from the unit 400 to a null should the external reference be lost.

The variable backlash amplifier (FIGURE 2B) includes a main common rail 601 connected to the common line 124, a positive rail 602 connected to the positive lead 112 and a negative rail 603 connected to the negative supply lead 113. Connected across the rails 602, 603 are two emitter followers 604, 604' and 605, 605' one an n-p-n and the other a p-n-p and it is the base of the first which receives the output from the rectifier unit. The purpose of the emitter follower 604 is to increase the input impedance of the amplifier and the purpose of the emitter follower 605 is to compensate for any emitter-base changes in the first transistor due to temperature variations. A resistor 606 is connected between the rail 602 and the collector of the emitter follower 604 and a further resistor 607 is connected between the rail 603 and the collector of the emitter follower 605. The amplifier includes two further, n-p-n, transistors 608, 609 which form a long-tailed pair and which have their collectors connected, through resistors 610, to the rail 602 and their emitters connected, through resistors 611, to the fixed terminals of a variable resistor 612. The base of the 608 transistor is connected to the emitter of the transistor 605 and the base of the transistor 609 is connected to the common rail 601. A capacitor 610' is connected across the collector-base junction of the transistor 608. The slider of the variable resistor 612 is connected through a resistor 613, to the slider of a further variable resistor 614, which is itself connected between the rails 601, 603 with resistors 615 interposed between each rail and the variable resistor 614. The collectors of both transistors 608, 609 are connected through Zener diodes 616 and series resistors 617 to the rail 603, with a connection from the diode 616 associated with the transistor 608 to the base of an n-p-n transistor 618A.

This latter transistor has its collector connected, through two resistors 619A, 620A, to the supply lead 131. The base of the transistor 618A is also connected through a capacitor 621A to the rail 601 and the emitter of this transistor is directly connected to this common rail. The common terminal of the resistances 619A, 620A is connected to the base of a p-n-p transistor 622A, the emitter of which is connected through a diode 623A to the supply lead 131 and the collector of which is connected through resistor 624A to the control electrode of a silicon controlled rectifier 625A. This latter control electrode is also connected, through a resistor 626A, to the supply from the lead 116. The collector of the transistor 622A is also connected to the rail 601 through a diode 627A and to the base of the transistor 619A through a resistor 628A. The silicon controlled rectifier 625A is connected between the solenoid winding 11A and the common rail 601, the other end of the solenoid winding being connected to the supply from the lead 125. A diode 629A is connected in parallel with the solenoid winding 11A.

The transistors 618A and 622A form a trigger circuit controlling the valve A and if the base of the transistor 618A is raised above approximately +0.4 volts with respect to the rail 601, when the supply from the line 125 rises, the transistor 618A is turned on to switch on the transistor 622A which lifts the trigger electrode of the silicon controlled rectifier to fire it. If the input to the base of the transistor 618A is removed then the circuit will switch itself off at the next supply zero volts. The rectifier fires at the least over a 150° firing angle.

The valve B is provided with a similar controlling rectifier and trigger circuit the components of which are given the same reference numerals as their counterparts in the circuit for the valve A but with the letter B after each numeral. The circuit for the valve B is similarly connected to the positive supply lead 131 and the negative supply lead 116 although the base of the transistor 618B is connected to the transistor 609 rather than the transistor 608 of the amplifier.

In operation of the amplifier, an output from the rectifier unit 500 causes either of the transistors 608 and 609 to conduct dependent upon the polarity of this output with respect to common rail.

In fact in the control system described, the polarity of the rectifier unit output with respect to the common line is negative if the speed reference signal is greater than the speed dependent signal for forward travel of the cutting element and is positive if the reference signal is less than the speed dependent signal for the same direction of travel. For reverse travel the polarities are reversed. In the event of the output from the rectifier unit being negative, the transistor 604 is switched off with the result that the transistor 605 becomes more conductive. This causes transistor 608 to become less conductive, the transistor 609 of course becoming more conductive. As a result of the transistor 608 becoming less conductive, current flow through the diode 616 and series resistor 617 to trigger the transistor 618A. This effects opening of valve A which, it will be recalled, increases the speed of cutting element advance in the forward direction. If the output from the rectifier unit is positive, the reverse action takes place with the result that valve B is opened to reduce the speed of cutting element travel.

The variable resistor 612 is used to balance the two trigger circuits controlling valves A and B and the variable resistor 614 sets the voltage level of the collectors of the transistors 608, 609 so that the input to the base of the transistor 604 can be made to vary from 0 to 1 volt approximately before the solenoid circuit of the valve A or B (as the case may be) is triggered.

The valves C and D also have similar controlling rectifiers and trigger circuits and the components in these two circuits have therefore been referenced with a letter C for the valve C circuit and D for the valve D circuit. However these latter circuits each include an input emitter follower 630C, 630'C or 630D, 630'D, as the case may be. The emitter follower 630C comprises an n-p-n transistor having its collector connected to the lead 112 and its emitter connected both to the negative rail through a resistor 631C and directly to the base of the transistor 618C. The base of the transistor 630C is connected through a resistor 632C to the supply lead 112 and to this base is also connected the load control unit 700 and the end of cut and stop control units 800, 900. The emitter follower 630D is of the same arrangement as the follower 630C except that the base of the latter emitter follower is connected to the end of cut and stop control units only.

The load control unit 700 (FIGURE 2A) monitors the output voltage of the above referred to current transformer, as described in FIGURE 1, the primary winding of which carries the load current of the cutting element motor. The voltage is fed to a full wave rectifying bridge 702 across the output terminals of which is connected a first variable resistor 703. The slider of this resistor is connected, through a resistor 704, to the central lead 135 from the secondary winding 121 of the supply unit transformer 117, one of the fixed terminals of the variable resistor being connected to a common lead 705 connected to the main common lead 108. The unit 700 includes a second full-wave rectifying bridge 706 connected across the two outer leads 133, 134 from the secondary winding 121.

Across the output terminals of the bridge rectifier 706 is connected, a capacitor 706', a series combination of two resistors 707, a thermister 708 and a Zener diode 709. Across the latter two components are connected, a capacitor 710 (the positive side of which forms an output terminal which is connected to the off-load and delay unit 800), two capacitors 711 in series, the junction of which is joined to the common line 705, a resistor 712 and a variable resistor 713 in series, and a further resistor 714 and variable resistor 715 in series. There are two further supply lines 716, 717 which are connected respectively to the leads 112, 113 and which supply power to five transistors in the unit. The first transistor 718 (p-n-p) has its emitter connected to the common line 705, its collector through a resistor 719 to the line 716, and its base connected through a resistor 720 to the slider of the potentiometer 713. Also the base of this transistor is connected, via a diode 721, to the common line 705, and also through a resistor 722 and capacitor 723 in parallel to the emitter of the second transistor 724 (n-p-n). The emitter of the second transistor is also connected through a resistor 725 to the supply line 717, its collector is connected through a resistor 726 to the supply line 716, and its base connected via a Zener diode 727 to the collector of the transistor 718. The third transistor 728 (p-n-p) has its collected via a Zener diode 727 to the collector of the transistor nected through a Zener diode 729 to the emitter of the transistor 724. The emitter of the transistor 728 is connected through a resistor 730 to the supply line 716. The fourth transistor 731 (n-p-n) has its collector joined to the supply line 716, the emitter connected via a resistor 732 to the supply line 717 and the base connected through a Zener diode 733 to the collector of the transistor 724. The fifth transistor 734 (n-p-n) has its collector connected to an output terminal which is directly coupled to the base of the transistor 630C. Its emitter is connected directly to the common line 705 and its base connected through a resistor 735 to the slider of the resistor 715, and also via a parallel connected capacitor 736 and diode 737 to the common line 705. The emitter of the transistor 731 is connected via a diode 738, to the rectifier unit 500. This latter connection is joined to the emitter of the third transistor 728 via a diode 739. The emitter of the transistor 731 is joined to the common line 705 via a diode 740 and the emitter of the transistor 728 is also joined to the common line via a diode 741.

The operation of the unit 700 is as follows. with no output from the current transformer 15, the capacitors 711 balance the bridge rectifier 706 about the common rail 705. As a current is drawn by the cutting element motor, the output of this rectifier is unbalanced about the common lead 705 to move positive. Depending upon the magnitude of this current, at a preset level dictated by the setting of the variable resistor 713, the transistor 718 is switched on, to cut-off the transistor 724, which switches on the two transistors 728, 731, and the emitter output of the transistors 728, 731 will turn the diode 738 onto its forward resistance thereby to feed into the rectifier unit 500 a positive signal. Now it shall be remembered that in the forward direction of cutting element advance, a positive signal from the unit 400 causes valve B to be operated to slow down the speed of cutting element travel. Therefore this load over-rides the normal speed control.

In the event of an extreme overload, say 150% above normal load current, as set by the variable resistor 715, the transistor 734 is turned on to de-energize the solenoid of valve C thereby to reduce the travel speed quickly. When the base of the transistor 724 is lifted positive, the collector voltages fall and the base of the transistor 630C is pulled down to cut off this transistor. This switches off transistor 618C which in turn switches off transistor 622C, to switch off the rectifier 625C. As soon as the overload is removed, the solenoid of valve C is again energized to allow the capstan motor once more to be controlled by the transistors 718, 724 or the speed control.

The end of cut control includes a first p-n-p transistor 801 having its emitter connected to a positive supply line 802 connected to the lead 716 (FIGURE 2A) and its base connected through a diode 803 and two series capacitors 804, to the line 742 of the load control unit. A further diode 805 is connected between the common terminal of the diode 803 and condensers 804 and the lead 802. Furthermore a variable resistor 806, the slider of which is also connected to the lead 802, and a series fixed resistor 807 together with a parallel diode 808 is connected across the emitter base junction of the transistor 801. The collector of the transistor 801 is connected through two series resistors 809, 809' to a negative lead 810 connected to the lead 717 (FIGURE 2A), the common terminal of these resistors being connected, through a diode 811, to the base of a second, n-p-n, transistor 812 connected between the positive lead 802 and a common lead 813 with the collector connected to the former through a resistor 814. The collector of the transistor 812 is also connected, through a diode 815, to the lead from the load control unit to the trigger circuit for the valve C and, through a further diode 816, to the base of the transistor 630D. The collector of the transistor 812 is further connected to the base of the transistor 801 through a resistor 819. A diode 817 and series resistor 818 is connected between the base of the transistor 812 and the negative lead 810 and a resistor 820 connects the base to the lead 802.

The end of cut control unit also includes a supply-on five second delay timer composed of a third p-n-p transistor 821, the emitter of which is connected, through a resistor 822, to the lead 802 and the collector of which is connected to the negative lead 116. The base is connetced to the common terminal of a series capacitor and diode arrangement 823, 824 in a lead connected across the supply lead 802 and a common lead 813. A parallel resistor and diode 825, 826 is connected between this latter lead and a lead from the positive supply line 125 which lead incorporates a series diode and resistor 827, 828. This lead also incorporates a parallel resistor capacitor arrangement 829, 830 through which the lead is connected to the common rail 813. The emitter of the transistor 821 is also connected, through a series resistor 831 and diode 832 to the base of the first transistor.

The stop control unit consists of a first n-p-n transistor 907, the collector of which is connected through two series resistors 908, 909 to the lead 905 and the emitter of which is connected to the lead 906. The base of this transistor is connected through a resistor 910 to the terminal 902 and, through a resistor 904, to the negative lead 906. A diode 912 is connected between the base of this transistor and the lead 906. The stop control unit further consists of a second p-n-p transistor 913 having its emitter connected to the positive lead 905 and its collector connected, through two resistors 914, to the lead 906. The base of the transistor 913 is connected through a resistor 915, to the terminal 901 and through a resistor 903 to the lead 905, a diode 916 being connected between the base of this latter transistor and the positive supply line 905. The common terminal of the resistor 914, is connected to the base of a third n-p-n transistor 917, the collector of which is connected through a resistor 918, to the line 905 and also via a diode 920 to the base of a fourth n-p-n transistor 921. A diode 919 is connected across the emitter base junction of the transistor 917.

A diode 920 is connected from the junction of the two resistors 909, 908 to the base of a fourth transistor 921 (n-p-n) the collector of which is connected through two diodes 922, 923 to the leads to the transistors 630C and 630D. The collector is also connected through a resistor 924 to the positive lead 905. The emitter is connected to the common line 925. The stop control incorporates a switch-off five second delay timer composed of a fifth p-n-p transistor 926 the emitter of which is connected to the common line 925 and the collector of which is connected through a resistor 927 to the lead 906. The base of this transistor is connected to the common terminal of two series resistors 928, 929 connected between the lead 905 and the collector of a transistor 930 which will be described later. This common terminal is also connected, through a diode and series capacitor 931, 932 to the collector of the transistor 921, a further connection being taken from the capacitor 932, through a Zener diode 833, to the common terminal of a resistor 818 and series diode 817 of the end of cut control unit. A resistor 933 connects the common terminal of the diode and series capacitor and series diode 931, 932 with the common rail.

The delay unit is further composed of a sixth transistor 934 (n-p-n) having its collector connected through a resistor 935 to the lead 905 and, through two diodes 936, 937, to the emitter follower for the valves C and D. The emitter of the transistor 934 is connected to the common line 925, and the base to the common terminal of two series resistors 938, 939 connected between the positive line 905 and the collector of the transistor 926. This collector is also connected, through a capacitor 940 to the base of the transistor 930 the emitter of which is connected to the common line 925 and the collector which is connected through a resistor 941 to the negative lead 906. A further resistor 942 is connected between the base and the lead 906.

The function of the end of cut control is as follows. When the cutting element clears the coal face at the end of a cut, the load on the cutting element motor, and hence the output from the load control circuit, will suddenly fall. After the load has fallen by a predetermined amount the transistor 801 is pulsed on through the series capacitors 804, which will cause the transistor 812 to be switched on. It will be remembered from the description of the load control unit 700, that connection of the base of the transistor 630C to the return line 705, 813 causes valve C to be opened. Likewise, therefore, the transistor 812 causes both valves C and D to be opened. The end of cut circuit is reset by switching off the potentiometer controller.

Turning now to the stop control, the stop control circuit is broken by the potentiometer when it is desired to stop the hydraulic motor 2. This removes the base current of the transistors 907, 913 turning these off. As a result the transistor 921 which is normally non-conductive is switched on which causes valves C and D to open. The transistor 917 is turned off by the transistor 913, and here it should be mentioned that the provision of the "NOR" circuit constituted by the two diodes 920 ensures that if either circuit of the speed control potentiometer is broken the transistor 921 is switched on to open the valves C and D. Switching off at the potentiometer also causes the transistor 926 to be switched on as the base of this latter transistor is pulsed by the transistor 921. The collector of the transistor 926 rises to turn on the transistor 934 and to turn off the transistor 930. Feedback from the collector of the transistor 930 via the resistor 928 takes over control and switches the transistor 926 fully on. The capacitor 940 previously charged to approximately 10 volts now starts to discharge through the resistor 942. After five seconds has lapsed, the base of the transistor 930 will have risen enough to turn this transistor on again and the delay circuit returns to its former condition before being pulsed. The transistor 934 in being switched on for five seconds after the equipment has been stopped prevents valves C and D from closing until this five second period has ended. If the potentiometer is turned on inside five seconds, the transistor 921 switches on the transistor 812 to hold valves C and D open.

The end of cut control unit incorporates, as mentioned above, a supply-on timer. When the supplies to the equipment are re-made, the capacitor 830 is in a discharged condition and via the transistor 821 switches on the transistor 801. This as previously mentioned switches on transistor 812 which opens the valves C and D. The capacitor 830 now charges to +10 volts limited by the diode 826 through the resistor 825 and the base of the transistor 821, and after five seconds switches off the transistor 821. Thus the valves C and D are held open for five seconds.

Such a re-making of supplies would take place upon closure of the no-volts relay contact 127. Loss of supply voltage to the cutting element motor, causes this relay to trip interrupting current to the valve controlling rectifiers (causing solenoids C and D to de-energise) and to the supply-on timer.

In operation of the machine, assuming that the potentiometer is at its zero output position, switching on of the cutting element drive automatically supplies the pump motor 6 but, owing to solenoids C and D being de-energised, the cutting element will not be traversed. To move the cutting element in the forward direction, the potentiometer must be set to the desired speed setting which energises solenoids C and D and produces an unbalance in the phase sensitive rectifier unit causing solenoid A to be energised. The valve will then pass oil into the thrustor block causing the hydraulic pump to deliver oil to the hydraulic motor 2 so that this rotates to move the cutting element. The hydraulic motor will increase in speed in this condition until the thrustor block has moved a predetermined distance, this being monitored by the linear variable differential transformer 14 which eventually produces an output signal equal and opposite in magnitude to the signal produced by the potentiometer. At this point, the solenoid A will be energised and the thrustor block will lock in position and remain locked until a further unbalance between the signals from the potentiometer and transformer arises. The output of the hydraulic motor remains constant and thus moves the cutting element at a fixed speed.

By manipulating the potentiometer back towards the zero position, the signal balance will again be unequal but in the opposite sense and the valve B will then function in a similar fashion to valve A except that it decreases the speed of the cutting element until balance has been obtained between the potentiometer and transformer signals whereupon the speed will again stabilise. The cutting element is halted by setting the potentiometer at zero to de-energise the valves C and D.

To enable the over-riding load control to be brought into operation, the potentiometer is wound onto a full speed position and, during the resulting acceleration period of the machine, a predetermined loading is attained by the cutting element. At this stage the load control over-rides the speed control and the output speed will vary as cutting resistance varies through operation of the valve B and, if the load falls below a predetermined value, valve A will again be operated to increase the speed and hence the load. The cutitng element will, therefore, speed up, slow down or maintain a steady speed according to the load it is demanding from the electric supply which load will be maintained substantially constant.

During the load control of the machine, it may happen that a sudden overload occurs on the cutting element which the valve B is unable to deal with sufficiently rapidly to avoid the cutting element stalling. In these circumstances, the load control will de-energise the solenoid C to bring the thrustor block quickly back to its zero position. If this is achieved without stalling the element and thus operating the no-volts relay, the speed of travel of the element will decrease quickly and the load requirements will fall. The solenoid C is then energised and the valve A will increase the machine speed back to the predetermined limit of load. Should, on the other hand, the stalled condition be reached for the cutting element, the no-volts relay will trip out leaving the thrustor block in a non zero position, that is, in a position for speed output of the capstan motor as soon as the supply is restored. The next switch-on of the apparatus could then bring about an immediate speed output from the hydraulic motor creating a dangerous situation in the form of an unexpected movement of heavy equipment. To avoid this the valves C and D are held open for the aforementioned time interval after switch-on to permit the thrustor block to return to the zero position during which any output from the pump will by-pass the capstan motor, whereafter the equipment is made available for normal operation.

On leaving the cut, acceleration of the machine due to loss of load is prevented by the end of cut control which opens the valves C and D until the potentiometer controller is returned by hand to zero.

In the event of it being desired instantly to interrupt supply of pressure fluid to the capstan motor, the aforementioned haulage switch 20 on the controller is operated which again brings about opening of the valves C and D. Operation of the switch winds back the potentiometer controller by a mechanical connection.

A further safeguard is provided in the provision of the complete emergency stop switch 21 which may be operated from a distance by a chain or cord. The operation of this switch shuts down the complete system, cutting off the electric supplies to the hydraulic pump motor and cutting element drive. Once this is done, the potentiometer control must, as previously mentioned, then be turned off before the equipment can be operated.

It will thus be seen that speed control is available over the complete speed range of the equipment in the form of a stepless control subject to the over-riding operation of the load control. During operation of the apparatus it will normally be required to attain maximum output from the cutting element to within closely prescribed limits and due to variation in the resistance offered to cutting, this will be required to be achieved automatically without the necessity of continually adjusting the potentiometer setting and the load control, which operates in both directions of cutting element travel, enables this to be achieved. The response time of the entire system may, in fact, be varied by inserting an electrical backlash band between the operating points of the valves A and B and/or by varying the hydraulic flow rates through the hydraulic control circuit.

In the claims:

1. A material cutting apparatus having a cutting element, comprising:
    propulsion means for traversing the cutting element during a cutting operation,
    said traversing means incorporating a fluid pressure operated traversing motor,
    a variable delivery fluid pressure pump connected to said motor to supply oil thereto,
    means for driving said pump and a control element for regulating by its position the output of said pump thereby controlling the speed of said cutting element travel,
    means connected to said control element for producing a first electrical signal dependent in strength upon the position of said control element,
    means for producing a second signal which is a variable strength speed reference signal,
    means for producing a third signal when the load on said cutting element exceeds a predetermined load value,
    first control means responsive to said first and second signals and operative to adjust the position of said control element to increase or decrease the speed of cutting element travel depending upon the strength of said second signal relative to that of the first signal,
    second overriding control means responsive to said third signal and operative, when a load signal is produced, to adjust said control element to restrict the speed of travel so as to limit the load on the cutting element, and
    third control means responsive to said third signal and operative, when the cutting element is overloaded by a predetermined amount, thereby rapidly adjusting said control element to restrict the speed of said cutting element.

2. Apparatus as in claim 1, wherein the control element comprises a fluid pressure operated thrustor block mounted in a cylinder and movable, from a central position in which the pump output is zero, in one direction to cause the pump to operate the motor in a cutting element advancing sense and in the opposite direction to cause the pump to operate the motor in a cutting element withdrawing the speed of said cutting element travel depending upon the thrustor block displacement from the central position,
    a pressure fluid supply circuit for said thrustor block and valve means in said circuit operable by said first and second control means,
    said valve means including a first valve arranged upon operation to admit pressure fluid to the thrustor block cylinder to displace the thrustor block in said one direction and a second valve arranged upon operation to admit pressure fluid to said cylinder to displace the thrustor block in the opposite direction.

3. Apparatus as in claim 2, including a third valve arranged upon operation to admit fluid to the thrustor block cylinder to rapidly restore the thrustor block to its central position, said third valve being operable by said third control means.

4. Apparatus as in claim 2, wherein the first signal producing means comprises a linear voltage differential transformer operatively connected to said thrustor block and said second signal producing means includes a manually operable potentiometer, said cutting element being provided with an electric driving motor and the third signal producing means comprising a current transformer arranged to monitor the current through said motor, and a current supply circuit and switching means connected in said current supply circuit and controlled by said transformer.

5. Apparatus as in claim 4, wherein said first control means includes a phase sensitive rectifier connected to the potentiometer, differential transformer and the switching means, and operative in the absence of a load signal to provide an output signal of one polarity when the strength of the first signal exceeds that of the second signal and, in the presence of a load signal, to provide an output signal of opposite polarity.

6. Apparatus as in claim 5, including a by-pass valve interposed between the pump and the traversing motor, and an end of cut control circuit connected to the current transformer and arranged, upon the load on the cutting element falling by a predetermined amount, to operate said third and by-pass valves, said potentiometer incorporating means for resetting the end of cut control when positioned in a zero reference signal position.

7. Apparatus as in claim 6, wherein said potentiometer is provided with means for operating said third and by-pass valves when in a zero reference signal position and is associated with means for holding the third and by-pass valves in an operating condition for a predetermined time after return of the potentiometer to its reference signal position independently of the position of the potentiometer, and said end of cut control circuit incorporates means for holding said third and by-pass valves in operating condition for a predetermined time following current supply to said circuit being made.

References Cited

UNITED STATES PATENTS 3,223,180   12/1965   Akin et al. _____ 173—7

FOREIGN PATENTS 844,802   8/1960   Great Britain.
906,931   9/1962   Great Britain.
944,882   12/1963   Great Britain.

ERNEST R. PURSER, *Primary Examiner.*